UNITED STATES PATENT OFFICE.

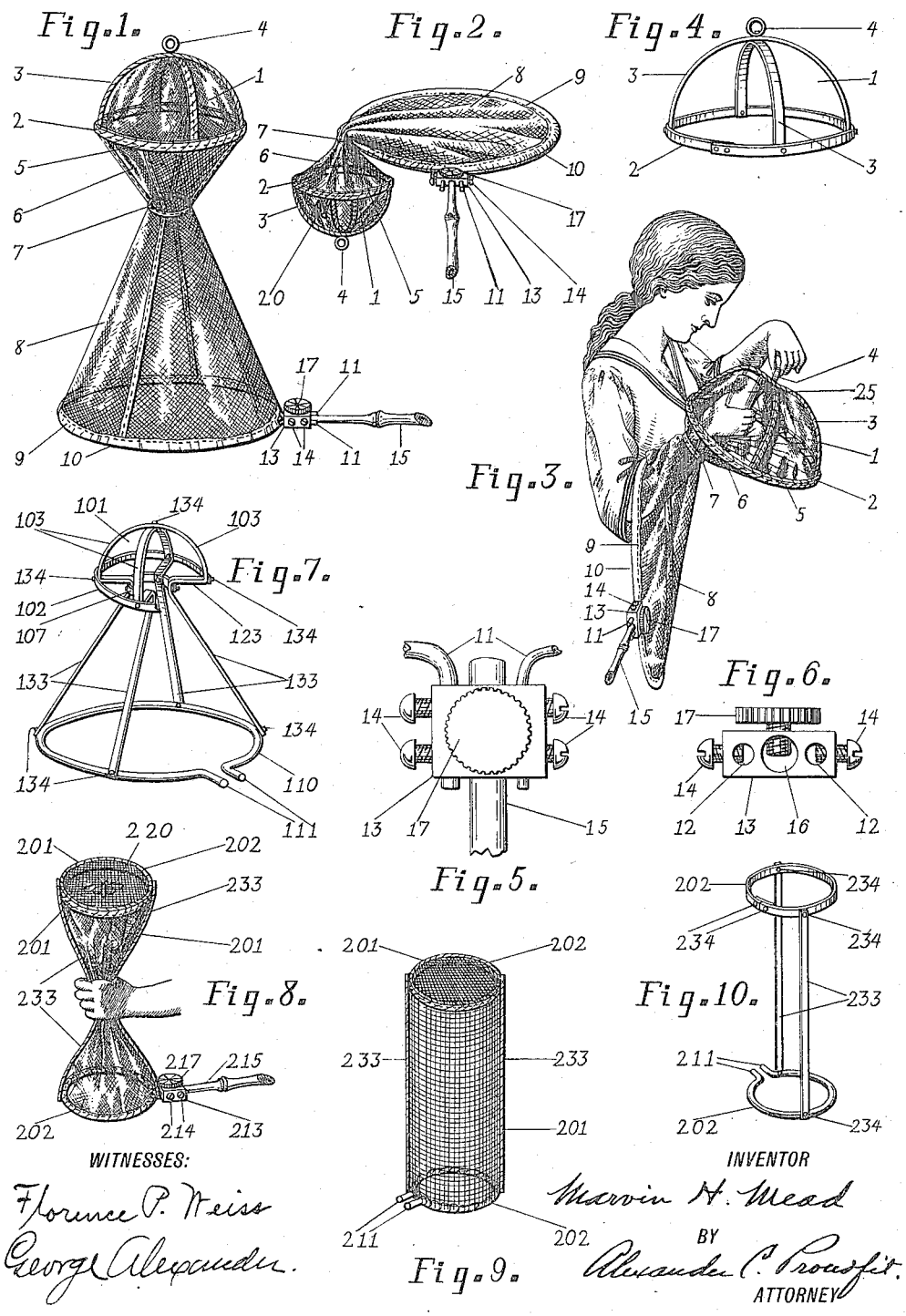

MARVIN H. MEAD, OF PASSAIC, NEW JERSEY.

NET FOR COLLECTING SPECIMENS.

1,143,721.   Specification of Letters Patent.   Patented June 22, 1915.

Application filed December 23, 1913. Serial No. 808,383.

*To all whom it may concern:*

Be it known that I, MARVIN H. MEAD, of Passaic, New Jersey, have invented certain Improvements in Nets for Collecting Specimens, of which the following description, in connection with the accompanying drawings, is a specification, like letters on the drawings designating like parts.

This invention relates to nets for collecting specimens, such as butterflies and other insects and is of special utility when used as a net for capturing insects on the wing, although I contemplate the use of my improvements in any field for which they are adapted by their nature.

An important object of my invention is to provide a net constructed and arranged to avoid the mutilation of the specimen which often occurs with existing forms of net, especially when the insect is of delicate structure, or so active in its attempts to escape that it is injured by the folds of the net in which it is enmeshed.

In carrying out my invention I prefer to provide a net with a portion having means to maintain it in dilated condition, so that whatever the position of the net a certain amount of freedom is given to the insect, in the chamber thus formed, and it is entirely freed from the danger of injury due to the crushing or rubbing action of the folds of the net.

Among other objects of my invention is the construction and arrangement of this chamber in such a manner as to permit the collector to catch a number of insects simultaneously or in immediate succession, the chamber serving to give ample space to inclose several specimens without danger of their injuring each other, by rubbing their bodies and wings together.

Another important object of my invention is to provide means whereby the operator can readily introduce a lethal vessel within the net to remove the specimen without danger of escape of the latter.

Still another object is to provide means for the ready attachment of the net to a handle and its displacement therefrom or replacement upon a substitute handle if the handle is broken or one of a different type is desired; also to provide means for ready readjustment to the handle of the net-hoop when the same is broken near the handle, without the need for taking the net to a repair shop, as must be done usually when the hoop breaks thus, as is frequently the case.

The various features of my invention will be illustrated and described fully in the accompanying drawings and specification and pointed out in the claims.

In the drawings, Figure 1 is a view in perspective of a specimen net in the construction of which my invention has been embodied; Fig. 2 is a perspective view of the same net, upon a somewhat smaller scale, and showing the net in position to retain a specimen which has been captured; Fig. 3 illustrates an operator in the act of introducing a lethal vessel to remove a specimen; Fig. 4 is a view in perspective showing the preferred form of structure for insuring dilation of the specimen chamber; Fig. 5 is a fragmentary detail view in plan upon an enlarged scale, illustrating the attachment device by which the net ring is secured to the handle; Fig. 6 is a view of the attachment separately, in front elevation; Fig. 7 is a view of a modified form of structure for holding the net dilated; Fig. 8 is a view in perspective of a modified form of net embodying my invention, the same being shown in operation; Fig. 9 is a view of the net of Fig. 8 taken separately from its handle; and Fig. 10 shows in perspective separately the net supporting structure of Figs. 8 and 9.

In the embodiment of my invention selected for illustration and description to enable ready and complete understanding of my improvements, the part designated by the reference numeral 1 is a net which may be of any suitable material, such as the gauze ordinarily employed for butterfly nets which may, and preferably will be, waterproofed, and in accordance with my invention the net is provided with a supporting structure 2, which may be of any suitable material and shape to maintain a portion of the net dilated, this portion of the net being preferably of quite transparent gauze, and constituting a chamber 1 to receive the specimen 20, and in the instance selected for illustration by way of example, this structure takes the form of a metallic ring (see Fig. 4) preferably having arched members 3 in crown-like arrangement, with a suitable handle 4, these members preferably being covered with a suitable protecting cloth or fabric to which the net may be stitched as indicated at 5 in Fig. 1.

The material of the net is preferably extended entirely over the crown to inclose it entirely, and beyond the lower rim 2 to form an extension 6 of the chamber 1, and may, and preferably will be arranged as at 7 to form a neck or constriction, limiting the area of the exit, and beyond this constriction I prefer to widen the net as at 8 in the form of a funnel-like mouth, which may be secured to any suitable handle, and is illustrated in the instance described as secured to a ring 9 of fabric stitched over a metal hoop 10, the ends 11 of this hoop entering holes 12 (see Fig. 6) in an attachment clamp 13, where they are secured by binding screws 14 while the handle 15 enters a somewhat larger hole 16 and is there held by a binding screw 17. The handle attachment and hoop are readily interchangeable and the handle can be removed readily to reduce the space in which the net can be packed, or a different form of handle, or a new handle, can be readily attached to the net, and if the wire of the hoop is broken near the handle, the broken end can be quickly bent and clamped in place again. This net support and clamp is not claimed specifically herein, as it forms the subject of claims in my application for Letters Patent filed July 9, 1914, Ser. No. 849,909.

The completed net is used in the ordinary manner to capture an insect on the wing, which when it enters the funnel mouth portion 8 is directed through the neck 7 into the chamber 1 by continuing to swing the net in the direction of its opening, and then by turning the hoop as indicated in Fig. 2, the exit is closed in the usual manner, but the insect indicated by the reference numeral 20 is not crushed or rubbed by the folds of the net, an injury to which insects caught in the ordinary nets are always subject, but finds a capacious chamber 1 in which it has sufficient opportunity to keep its wings extended.

Upon reference to Fig. 3 the mode of removing a specimen by means of a lethal vessel 25 held in one hand by the operator while the other hand grasps the handle 4, will be readily understood, the arm of the operator practically filling the neck 7 so that no escape is possible, while the hoop 10 hangs upon the elbow, and the entire attention of the operator can be concentrated upon the location and careful capture of the specimen, or specimens, without injury to the latter.

An important capability of the invention is the ability to drop the net upon the ground with the insect inclosed, after the capture of the insects, without the possibility of injury to the latter, as it is often desired to direct the attention of the operator to the capture of another insect, or to the preparation of the lethal vessel, or other operations incidental to the arrangement of specimens, and with the net in the position shown in Fig. 2, whether in the air or on the ground, the operator is sure of the captive and of its protection from injury, and can leave it to become slowly accustomed to its surroundings and thus more quiet and more easily located by the operator as in Fig. 3.

In Fig. 7 I have shown a modified form of support in which the crown ribs of the structure for dilating the net are shown at 103 and these members are extended inwardly at the base of the crown structure, as indicated at 123, so that the chamber is of hemispherical shape, confined preferably by a ring 107, forming the throat near the plane of the outer ring 102, and the supporting members are preferably extended in an outwardly flaring shape as indicated at 133 and secured at 134, as by rivets to a suitable hoop 110 which may have its ends projecting as at 111 to be secured within a clamp 13 of the type illustrated in Figs. 5 and 6 and already described, it being understood that this structure will be covered by a suitable material and will then present substantially the appearance of the net shown in Fig. 1, but capable of being stood upright in the position illustrated in Fig. 7, the entire net forming a dilated chamber.

It is to be observed that the tendency of insects will be to remain in the upper chamber 101 formed within the members 103 and not to descend through the opening formed by the ring 107, so that when the operator is ready the entire structure can be lifted or tilted and a lethal vessel 25, such as that illustrated in Fig. 3 can be introduced to remove the specimen.

I have shown in Figs. 8, 9 and 10 a net of somewhat modified shape, comprising two end rings 202, 212 preferably of metal covered with cloth, to which is stitched the net material 201, the lower one of the rings constituting the entrance hoop, provided preferably with projections 211 by which it may be secured as at 214 to a clamp 213 fastened upon a handle 215 of the type already described with reference to Figs. 5 and 6.

In accordance with my invention I prefer to provide ribs 233 of flexible material, such as spring steel riveted to the hoops as at 234, and to which the material 201 is stitched, so that when free, these ribs will maintain the net material in the position illustrated in Fig. 9, dilated for the reception of a specimen, and the flexible character of these ribs permits them to be grasped by the hand of the operator as indicated in Fig. 8 so that the escape of the specimen 220 is prevented, and still a suitable chamber is left for its retention without injury. When released, the net will again assume the shape shown in Fig. 9.

Fig. 10 shows the supporting hoops and ribs separately.

Having illustrated and described my invention thus fully and suitable means by which the same may be carried into effect, I wish it to be understood that I do not limit myself to the materials nor to the forms of construction selected for illustration and description by way of example, nor in general do I limit myself otherwise than as set forth in the claims read in connection with this specification.

What I claim as new and desire to secure by Letters Patent of the United States is:—

1. A net for specimens of the class described; said net comprising a portion provided with a wide mouth-piece, and means to secure the same to a handle; and a portion of open-work material provided with a dilating member, to form a captive chamber for the reception of a plurality of insects with extended wings; the intermediate portion of said net being flexible, to permit closure of the exit from said captive chamber.

2. A net for specimens of the class described; said net comprising a portion provided with a wide mouth-piece, and means to secure the same to a handle; and a portion of open network provided with a dilating member, to form a captive chamber for the reception of a plurality of specimens, being of sufficient size to permit their limited flight; the intermediate portion of said net being flexible, to permit closure of the exit from said captive chamber, said intermediate portion being formed with a constricted neck through which a receptacle may be introduced for the removal of said specimens.

3. A frame for a specimen-net of the class described; said frame comprising a wide mouth ring; an open-work structure forming a captive chamber; and ribs connecting said parts.

4. A frame for a specimen net of the class described; said frame comprising a wide mouth ring; an open-work structure forming a captive-chamber; a narrow neck-ring; and ribs connecting said mouth-ring and open-work structure respectively with said neck-ring.

Signed at Passaic, in the county of Passaic and State of New Jersey this 26th day of November, 1913.

MARVIN H. MEAD.

Witnesses:
W. V. E. TUNISON,
ELIAS MEAD.

Copies of this patent may be obtained for five cents each, by addressing the "Commissioner of Patents, Washington, D. C."